US010248871B2

(12) United States Patent
Ramasamy

(10) Patent No.: US 10,248,871 B2
(45) Date of Patent: Apr. 2, 2019

(54) AUTONOMOUS LANE DETECTION

(71) Applicant: QUALCOMM Incorporated, San Diego, CA (US)

(72) Inventor: Bala Ramasamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 15/080,383

(22) Filed: Mar. 24, 2016

(65) Prior Publication Data
US 2017/0277960 A1    Sep. 28, 2017

(51) Int. Cl.
| G06K 9/00 | (2006.01) |
| G05D 1/00 | (2006.01) |
| G01S 5/02 | (2010.01) |
| G01S 13/74 | (2006.01) |

(52) U.S. Cl.
CPC .......... G06K 9/00798 (2013.01); G01S 5/02 (2013.01); G01S 13/74 (2013.01); G05D 1/0088 (2013.01)

(58) Field of Classification Search
CPC .. G06K 9/00798; G05D 1/0088; G07B 15/06; G07B 15/063; G08G 1/01; G08G 1/0965; G08G 1/0968; G08G 1/167; B60W 2550/40; G01C 21/3658
USPC ........ 701/23, 117, 119, 300, 400, 408, 469, 701/514, 518, 532; 702/94
See application file for complete search history.

(56) References Cited

U.S. PATENT DOCUMENTS

| 3,737,851 A * | 6/1973 | Marshall ............. G08G 1/01 340/435 |
| 5,483,455 A * | 1/1996 | Lay .................. G01S 13/345 701/469 |
| 6,076,040 A * | 6/2000 | Akutsu .................. G01S 5/14 180/167 |
| 6,219,613 B1 * | 4/2001 | Terrier ................. G01S 13/74 342/42 |
| 6,271,788 B1 * | 8/2001 | Longaker ............. G01S 19/07 342/357.31 |

(Continued)

FOREIGN PATENT DOCUMENTS

| JP | 2000020885 A | 1/2000 |
| WO | 2010007539 A1 | 1/2010 |

OTHER PUBLICATIONS

International Search Report and Written Opinion—PCT/US2017/016327—ISA/EPO—dated May 24, 2017.

(Continued)

*Primary Examiner* — Richard A Goldman
(74) *Attorney, Agent, or Firm* — Kilpatrick Townsend & Stockton, LLP

(57) ABSTRACT

Methods, systems, computer-readable media, and apparatuses for autonomous lane detection are presented. One example method includes the steps of receiving a signal from a first device; responsive to a comparison of a measured received frequency of the signal to a source frequency of the signal and to one or more thresholds, determining a distance to the first device; and determining a lane in which the vehicle is operating based on the distance and a lane map. Another example method further includes the steps of determining a location and a heading of the first vehicle; and outputting, to a crowdsourcing server, the location, the heading, and the distance to the first device.

26 Claims, 13 Drawing Sheets

(56) References Cited

U.S. PATENT DOCUMENTS

| | | | | |
|---|---|---|---|---|
| 6,577,246 | B1* | 6/2003 | Handa | G05D 1/0261 340/901 |
| 7,667,618 | B2* | 2/2010 | Chitor | G07B 15/063 340/933 |
| 8,175,796 | B1* | 5/2012 | Blackburn | G08G 1/161 340/902 |
| 8,219,443 | B2* | 7/2012 | Delia | G06Q 30/0207 705/13 |
| 8,228,205 | B2* | 7/2012 | Kohli | G08G 1/017 340/10.1 |
| 9,175,967 | B2* | 11/2015 | Abramson | G01C 21/3697 |
| 2002/0080060 | A1* | 6/2002 | Terashima | G07B 15/063 342/54 |
| 2003/0020634 | A1* | 1/2003 | Banerjee | G07B 15/063 340/928 |
| 2003/0067396 | A1* | 4/2003 | Hassett | C07K 14/44 340/8.1 |
| 2005/0203697 | A1* | 9/2005 | Dalgleish | G08G 1/01 701/117 |
| 2006/0145893 | A1* | 7/2006 | Hassett | G07B 15/063 340/928 |
| 2006/0226968 | A1* | 10/2006 | Tengler | G08G 1/052 340/466 |
| 2008/0095163 | A1* | 4/2008 | Chen | H04L 45/16 370/392 |
| 2008/0208459 | A1* | 8/2008 | Takahata | G01C 21/32 701/532 |
| 2009/0222202 | A1* | 9/2009 | Kato | G01C 21/3655 701/414 |
| 2009/0290869 | A1* | 11/2009 | Aono | G01C 21/26 398/25 |
| 2009/0322559 | A1* | 12/2009 | Yen | G08G 1/0965 340/901 |
| 2010/0082238 | A1* | 4/2010 | Nakamura | G01C 21/32 701/532 |
| 2010/0121569 | A1* | 5/2010 | Nakamura | G01C 21/30 701/532 |
| 2010/0299063 | A1* | 11/2010 | Nakamura | G01C 21/30 701/532 |
| 2011/0208387 | A1* | 8/2011 | Bosch | G07C 5/008 701/33.4 |
| 2012/0139774 | A1* | 6/2012 | Nagy | G01S 11/10 342/128 |
| 2012/0191271 | A1* | 7/2012 | Stuebing | B60W 30/12 701/2 |
| 2013/0090991 | A1* | 4/2013 | Underwood | G07B 15/063 705/13 |
| 2013/0204518 | A1* | 8/2013 | Melville | G01C 21/26 701/408 |
| 2013/0275033 | A1* | 10/2013 | Bastiaensen | G01C 21/26 701/119 |
| 2013/0342368 | A1* | 12/2013 | Nathanson | G07C 5/008 340/903 |
| 2014/0118182 | A1* | 5/2014 | Oh | G01S 13/867 342/52 |
| 2014/0149013 | A1* | 5/2014 | Matsuno | G08G 1/166 701/70 |
| 2014/0156158 | A1* | 6/2014 | Matsuno | G08G 1/167 701/70 |
| 2014/0333472 | A1* | 11/2014 | Nagy | G01S 13/48 342/133 |
| 2014/0358322 | A1* | 12/2014 | Ibrahim | G05D 1/0055 701/1 |
| 2014/0358324 | A1* | 12/2014 | Sagar | G08G 1/164 701/1 |
| 2014/0375808 | A1* | 12/2014 | Kao | H04N 7/18 348/148 |
| 2015/0081211 | A1* | 3/2015 | Zeng | B60W 30/0956 701/446 |
| 2015/0339927 | A1* | 11/2015 | Han | B60W 40/10 701/301 |
| 2015/0345966 | A1* | 12/2015 | Meuleau | G01C 21/3453 701/23 |
| 2016/0035219 | A1* | 2/2016 | Stenneth | G08G 1/00 701/400 |
| 2016/0307441 | A1* | 10/2016 | Wieskamp | G06K 9/00798 |
| 2017/0011465 | A1* | 1/2017 | Anastassov | G06Q 40/08 |
| 2017/0277960 | A1* | 9/2017 | Ramasamy | G05D 1/0088 |

OTHER PUBLICATIONS

Xu B., et al., "Doppler-Shifted Frequency Measurement based Positioning for Roadside-Vehicle Communication Systems," Wireless Communications and Mobile Computing, 2011, vol. 11, pp. 866-875.

Zarza H., et al., "RIALS: RSU/INS-Aided Localization System for GPS-Challenged Road Segments," Wireless Communications and Mobile Computing, 2015, 16 pages.

Zhuang P., et al., "Localize Vehicles Using Wireless Traffic Sensors," Mobile Entity Localization and Tracking in GPS-less Environments, vol. 5801 of the series, Lecture Notes in Computer Science, 2009, pp. 106-114.

* cited by examiner

AUTONOMOUS LANE DETECTION

BACKGROUND

While existing vehicle positioning and navigation systems are capable of determining on which road a vehicle is travelling, these systems are typically not capable of determining a lane of the road on which the vehicle is travelling, and in some cases, may incorrectly locate a vehicle on a road adjacent to the road it is in fact travelling on. Thus, existing positioning techniques are likely to be unable to provide sufficiently high-resolution position measurements to enable autonomous or semi-autonomous vehicles to navigate along a road without additional assistance, such as using computer vision to identify visual lane markers or sensors to detect objects, such as ferromagnetic objects, embedded in the roadway along lane divisions.

BRIEF SUMMARY

Various examples are described for autonomous lane detection. For example, one disclosed method includes receiving a signal from a first device; responsive to a comparison of a measured received frequency of the signal to a source frequency of the signal and to one or more thresholds, determining a distance to the first device; and determining a lane in which the vehicle is operating based on the distance and a lane map.

In another example, a disclosed system includes a non-transitory computer-readable medium; and a processor in communication with the non-transitory computer-readable medium and configured to execute program code stored in the non-transitory computer readable medium and to: receive a signal from a first device; responsive to a comparison of a measured received frequency of the signal to a source frequency of the signal and to one or more thresholds, determine a distance to the first device; and determine a lane in which the vehicle is operating based on the distance and a lane map.

One example non-transitory computer readable medium comprises executable instructions configured to cause a processor to: receive a signal from a first device; responsive to a comparison of a measured received frequency of the signal to a source frequency of the signal and to one or more thresholds, determine a distance to the first device; and determine a lane in which the vehicle is operating based on the distance and a lane map.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of autonomous lane detection. Those of ordinary skill in the art will realize that the following description is illustrative only and is not intended to be in any way limiting. Reference will now be made in detail to examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Autonomous Lane Detection

In one illustrative example of autonomous lane detection, a driver drives her car down a highway while following turn-by-turn navigation provided by an onboard Global Navigation Satellite System (GNSS)-based navigation system. In this example, the driver's car is operating in an autonomous driving mode, such that the driver's input is not needed to drive the car along the route. However, as a part of the autonomous driving mode, the car needs information regarding both which road it is on and which individual lane of the road it is in. The car's GNSS receiver has sufficient resolution to accurately determine which road it is travelling on, but it is not able to identify specific lanes of travel. Thus, the car is equipped with a navigation system capable of determining a lane of travel.

As she drives along the specified route, the navigation system in her car interacts with wireless access points ("AP"), which communicate, in this example, using the 802.11p protocol. The wireless APs in this example are placed along the road at various locations and provide wireless network capability for infrastructure equipment. As the car travels along the road, the navigation system in the driver's car receives signals transmitted from the wireless APs and attempts to use them to determine a lane of travel.

Figure 1A:
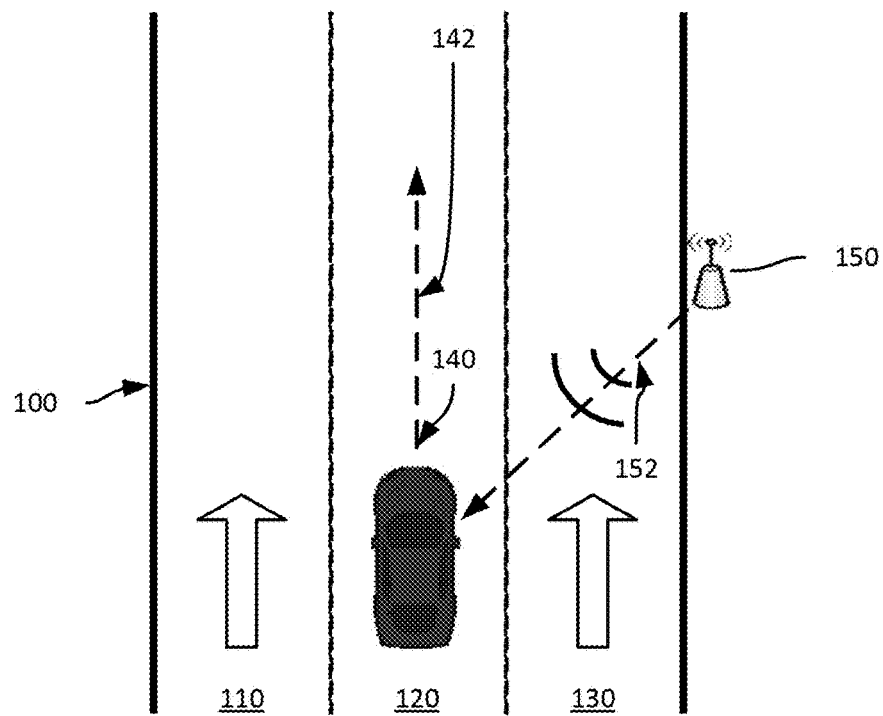
FIGS. 1A-4 show example road configurations for autonomous lane detection.
Figure 1B:
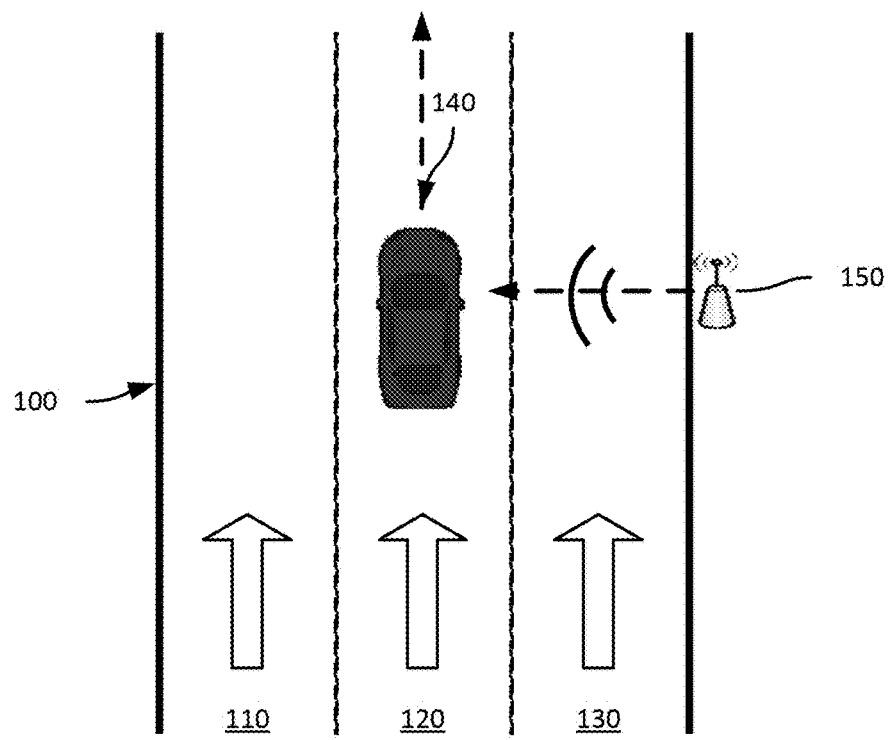

Referring to FIG. 1A, as the car 140 travels along the road 100, it approaches a wireless AP 150 positioned on the side of the road 100. As it does so, the car's navigation system may receive signals from the wireless AP 150 and determine characteristics about them, including a frequency shift resulting from the Doppler effect. Based on the frequency shift, the navigation system is able to determine whether the car 140 is approaching the wireless AP 150 or receding from it. If the car 140 is approaching the wireless AP 150, it can determine the magnitude of the frequency shift and compare it to a threshold. As shown in FIG. 1A, the car 140 is still travelling towards the wireless AP 150, and so the frequency shift will be significant. However, as the car 140 continues to travel, the frequency shift will decrease until the car 140 is alongside the wireless AP 150, as seen in FIG. 1B, at which point little to no frequency shift will be detected. After the car 140 passes the wireless AP 150, the frequency shift will again increase as the car travels away from the wireless AP 150. Thus, at a time when the frequency shift is within a threshold distance from zero, the car's navigation system can determine a distance between the car 140 and the wireless AP 150 to determine a lane of travel. But because the frequency shift alone does not provide a unique position with respect to a signal source, additional information, such as a ranging technique may be used to determine a distance to a signal source. At this time, the car's navigation system is able to determine a distance between the car 140 and the wireless AP 150 using a positioning technique, such as a time of arrival ("TOA") or round trip time ("RTT") technique. The navigation system then accesses a lane map for the road 100 and, using the distance information, the navigation system is able to determine the lane in which the car 140 is travelling. Thus, as the car 140 approaches a highway exit or an intersection at which a particular lane is needed, e.g., to make a turn or to avoid a turn lane, the car's navigation system is able to interact with the car's autonomous driving system, or a driver of the car, to provide guidance about how to position the car 140 on the road 100.

This illustrative example is not intended to be in any way limiting, but instead is intended to provide an introduction to the subject matter of the present application. For example, the illustrative example above is described with respect to an autonomous car; however, the present application is not limited to such an environment, but may be used in any suitable environment. Other examples of autonomous lane detection are described below.

Figure 5:
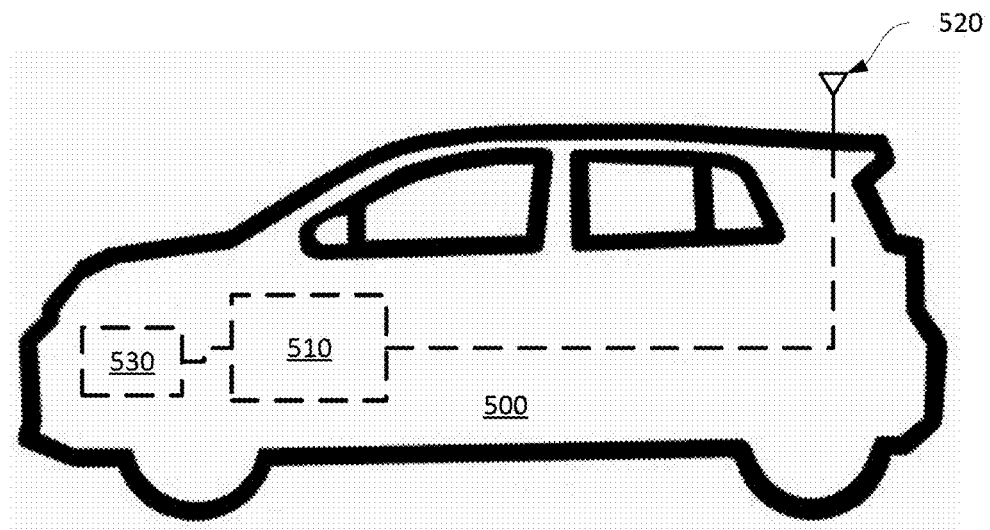
FIGS. 5-7 show example devices and systems for autonomous lane detection.

Referring now to FIG. 5, FIG. 5 shows an example system for autonomous lane detection. In the example shown in FIG. 5, a vehicle 500 has been equipped with a computing device 510 in communication with an antenna 520 and one or more sensors 530. Suitable vehicles may include motorized and non-motorized vehicles, including cars, trucks, busses, bicycles, and scooters. The computing device 510 is configured to receive radio signals from the antenna 520, and in some examples, may be configured to transmit radio signals using the antenna 520. For example, the computing device 510 may be configured to transmit signals that may be employed by other suitable computing devices according to this application for autonomous lane determination. Such signals may include information such as an identifier for the vehicle or computing device, a location of the antenna 520 on the vehicle, one or more dimensions of the vehicle, a lane of travel of the vehicle, a speed of the vehicle, a heading of the vehicle, or other information. It should be noted that the locations of the computing device 510, the antenna 520, and the sensor(s) 530 are merely examples, and in other examples, any suitable location within the vehicle 500 or other vehicle may be used. Further, lanes of travel may refer to traffic lanes on a road, bicycle lanes, or any other division of a surface used for vehicular traffic.

As shown in FIG. 5, the vehicle 500 may be equipped with one or more sensors 530 of the same or different types. For example, the sensors 530 may comprise optical sensors or electromagnetic sensors. One or more such sensors may be configured to detect lane markers, such as indicators (e.g., stripes) painted on the road surface, or material embedded within the road surface, such as ferromagnetic materials, which may provide information to the computing device 510 that may be used to determine a lane of travel, e.g., based on detections of lane changes, or to maintain the vehicle 500 within the lane during an autonomous or semi-autonomous driving mode. In some examples, the sensors 530 may include a steering wheel sensor, a wheel tick sensor or a rotary encoder for measuring wheel rotations, one or more accelerometers or gyroscopes, one or more image sensors, or one or more distance sensors.

The computing device 510 may further function as, or be in communication with, a navigation system of the vehicle 500. The computing device 510 may be configured in some examples to provide determined lane information to the navigation system to assist with autonomous driving functions or to assist with route planning, route following, or route deviation.

Figure 6:
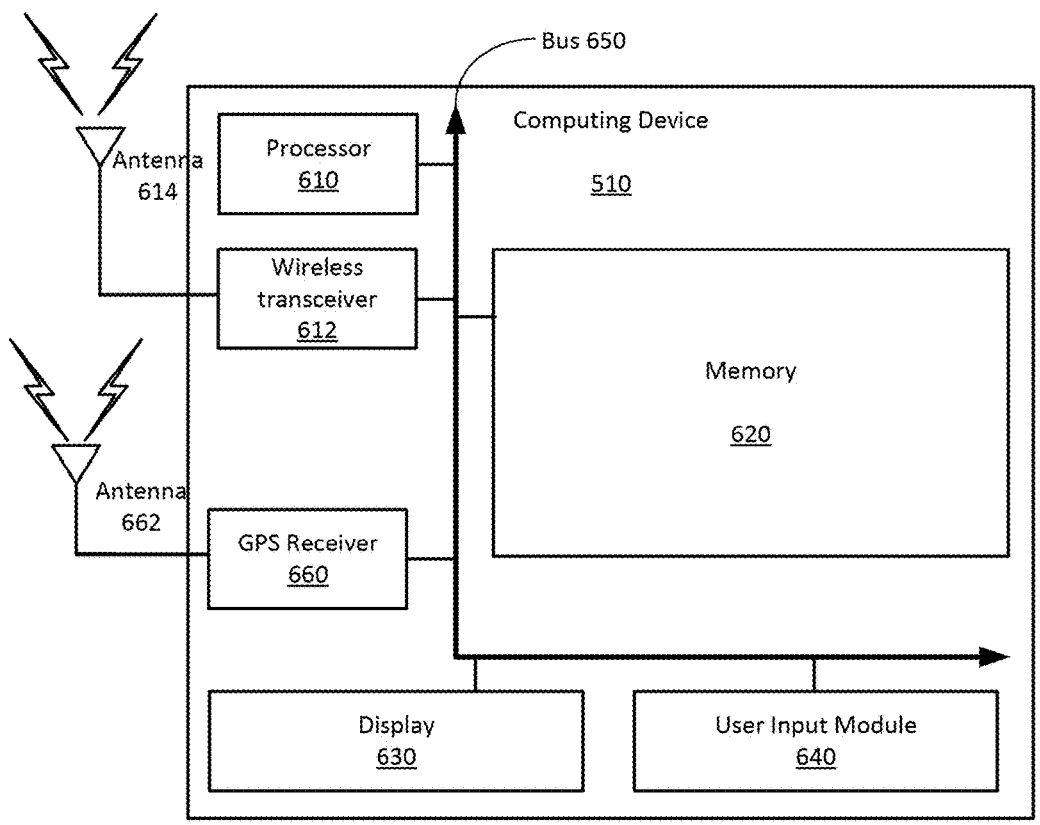

FIG. 6 shows a more detailed view of the example computing device 510 shown in FIG. 5. In the example shown in FIG. 6, the computing device 510 includes a processor 610, a memory 620, a wireless transceiver 612 and antenna 614, a GNSS receiver 660 and antenna 662, a display 630, a user input module 640, and a bus 650. In this example, the computing device 510 comprises a vehicle-based navigation system, but may be any suitable device, include an embedded computing device, a cellular phone, a laptop computer, a tablet, a phablet, a personal digital assistant (PDA), wearable device, or augmented reality device. The processor 610 is configured to employ bus 650 to execute program code stored in memory 620, to output display signals to a display 630, and to receive input from the user input module 640. In addition, the processor 610 is configured to receive information from the GNSS receiver 660 and wireless transceiver 612 and to transmit information to the wireless transceiver 612.

The wireless transceiver 612 is configured to transmit and receive wireless signals via antenna 614. For example, the wireless transceiver may be configured to receive radio signals from a wireless AP or other suitable wireless signal transmitter. In some examples, the computing device 510 may comprise one or more additional wireless transceivers and associated antennas that may be configured to communicate with a cellular base station by transmitting signals to and receiving signals from an antenna associated with the cellular base station. The GNSS receiver 660 is configured to receive signals from one or more GNSS satellites and to provide location signals to the processor 610. In some examples, other or additional positioning technologies may be employed, such as wireless LAN positioning, Bluetooth, or other sensors (including sensor-based dead reckoning for positioning). It should be noted that all of the components shown in the computing device 510 are not required in various examples. For example, the GNSS receiver 660 and antenna 662 are optional as are the display 630, and user input module 640 according to some examples.

The example computing device 510 of FIG. 6 can be employed in different implementations according to this disclosure. For example, the wireless transceiver can be used to receive a signal from another device, such as a wireless infrastructure access point. The processor 610 can then compare the frequency of the received signal and the frequency of the signal at the source, and then, based on the comparison, determine a lane of travel for a vehicle.

In some examples, the computing device 510 may be a standalone device that is not affixed to a vehicle, such as a smartphone. A smartphone in one example may determine that it is located within a vehicle, such as by connecting to one or more on-board computing systems, e.g., via Bluetooth, by detecting a speed of travel, or by the use of one or more features on the smartphone, such as a navigation or mapping function. The example smartphone may then be configured to perform one or more methods according to this disclosure.

Figure 7:
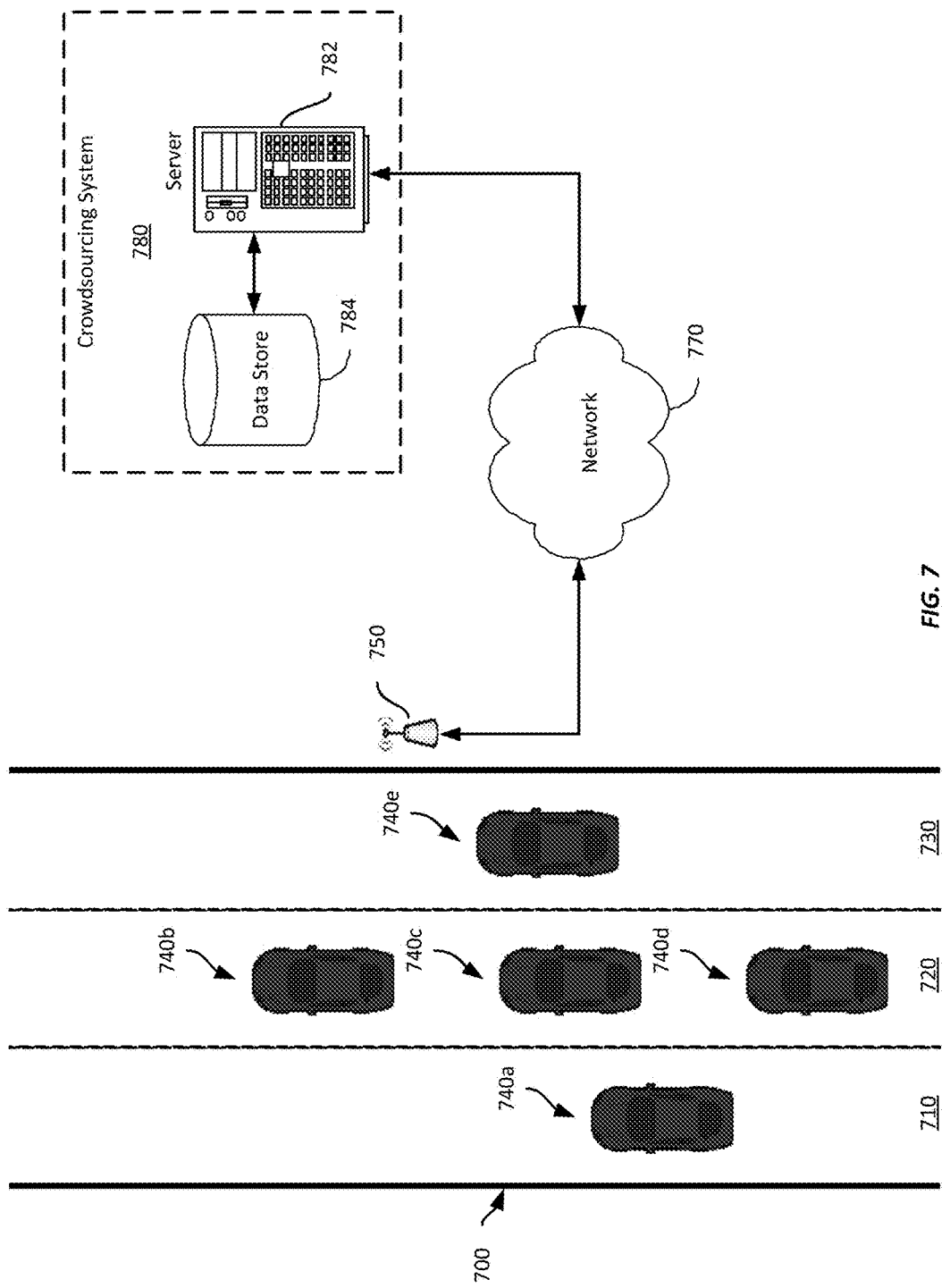

Referring now to FIG. 7, FIG. 7 shows an example crowdsourcing system 780 in communication with a plurality of vehicles 740a-e via a network in communication with a wireless communication node 750. The crowdsourcing system 780 includes at least one server 782 and at least one data store 784. The crowdsourcing system 780 may be configured to perform or assist with one or more methods according to this disclosure or to provide lane determination information, such as a lane map or a lane determination, to one or more computing devices, such as those affixed to vehicles 740a-e.

In the system shown in FIG. 7, suitable computing devices affixed to vehicles 740a-e are in communication with the crowdsourcing system 780 via the wireless communication node 750, which may be a cellular antenna, wireless AP, or other wireless transceiver device. The wireless communication node 750 is configured to communicate with one or more of the vehicles 740a-e, such as to provide a broadcast or point-to-point signal usable by one or more of the vehicles 740a-e for autonomous lane detection, and to receive signals from one or more of the vehicles 740a-e to provide information to the crowdsourcing system 780, or to receive information from the crowdsourcing system 780. For example, a vehicle may provide distance information measured between the vehicle and the wireless access node 750, or it may request lane information associated with the road 700. The vehicles 740a-e may use the signals transmitted from the wireless communication node 750 to determine a lane of travel based on a determined frequency shift of the received signal, and may communicate with the wireless communication node 750 to provide the determined lane information to the crowdsourcing system 780.

Figure 8:
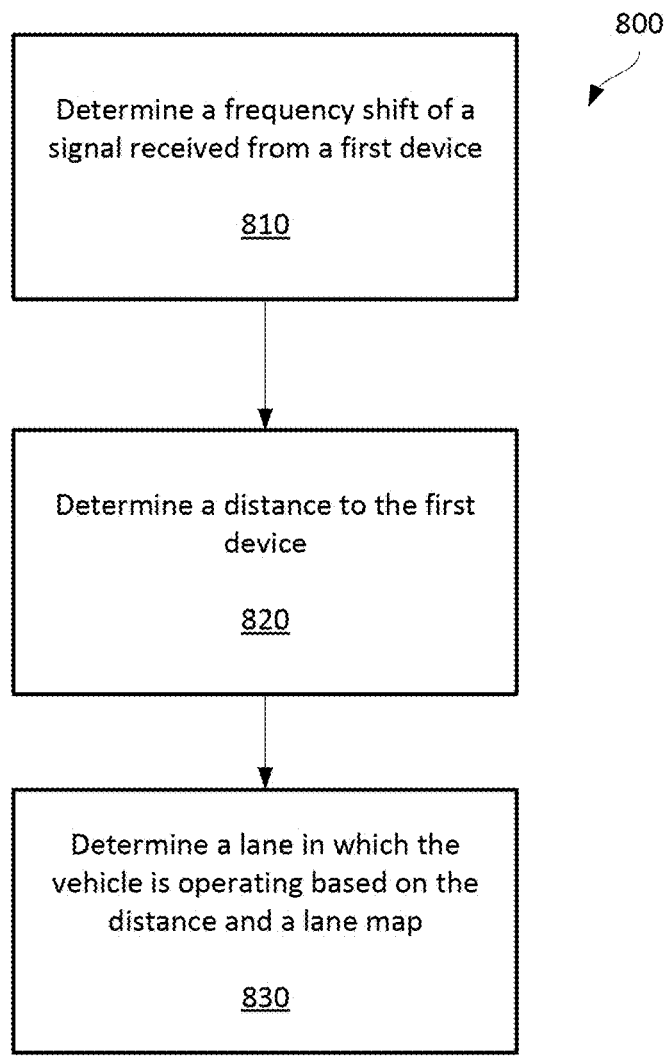
FIG. 8 shows an example method for autonomous lane detection.

Referring now to FIG. 8, FIG. 8 shows an example method 800 for autonomous lane detection. Reference will be made to the computing device 510 of FIGS. 5 and 6, however, any suitable example system according to this disclosure may be employed.

The method 800 begins at block 810, where the computing device 510 receives a signal from a first signal source. For example, the computing device 510 may receive a signal from a wireless access point or from a computing device affixed to another nearby vehicle.

At block 820, the computing device 510, responsive to a comparison of a measured received frequency of the signal to a source frequency of the signal and to one or more thresholds, determines a distance to the first device. In this example, the computing device 510 determines a frequency shift based on the frequency of a signal received from the first device, such as a wireless AP or other device transmitting a suitable signal, and an expected frequency of the signal (also referred to as a source frequency). For example, referring again to FIG. 1A, as the vehicle 140 travels down the road and approaches the wireless AP 150, the apparent frequency of the signals received by the computing device 510 will be higher than the frequency at which the signal was transmitted by the wireless AP 150 due to Doppler shifting. When the vehicle's direction of travel 142 is approximately orthogonal to the path 152 of the transmitted signal received by the computing device 510, e.g., as shown in FIG. 1B, the apparent frequency of the signal received by the computing device 510 will be approximately the same as the frequency of the signal transmitted by the wireless AP 150, and as the vehicle 140 recedes from the wireless AP 150, the apparent frequency of the signal will be lower than the frequency at which the signal was transmitted by the wireless AP 150, again due to Doppler shifting. Thus, the magnitude of the frequency shift, or the percentage shift of the source frequency, may be used to determine relative motion of the vehicle 140 and the wireless AP. Thus, the computing device 510 may determine a frequency of a received signal and determine a difference between the determined frequency and an expected frequency of the signal to determine the frequency shift, assuming the vehicle 140 is travelling directly towards the first device. For example, if the frequency of the received signal is 5.850000566 GHz, while the source frequency is 5.85 GHz, the frequency shift is calculated to be 566 Hz, or 96.7 parts per billion (ppb), as a percentage of the source frequency. Such a technique may be used even if the vehicle is not heading directly at the signal source.

In examples, such as shown in FIG. 1A, where the angle between the direction of travel 142 of the vehicle 140 and the path 152 of the signal is not zero, other calculations can be used to determine the Doppler shift. For example, a suitable formula for computing a Doppler-shifted frequency of a signal received by an observer, e.g., at the vehicle, is as follows:

$$f_o = \frac{1 + \frac{v_o \cos\theta_o}{v}}{1 - \frac{v_s \cos\theta_s}{v}} f_s$$

Where $f_o$ is the frequency of the observed signal, $f_s$ is the source frequency, $v_o$ is the velocity of the observer, $v_s$ is the velocity of the source, $\theta_o$ is the angle from the observer to the source, $\theta_s$ is the angle from the source to the observer, and v is the speed of the wave (the signal) in the transmission medium (e.g., air). As can be seen from the formula above, the measured shift in a received signal is related to an angle from the source, such as a wireless AP, to the vehicle. Hence a threshold for triggering when to determine a distance to a first device that is the source of the signal, for a given relative speed between the vehicle and the first device, can help approximate when the vehicle is passing the first device, which may be indicated when the angle from the source to the vehicle is approximately 90°. Hence, in one example, a frequency shift threshold may be set to correspond to when the vehicle is about 80° or 85° relative to the source, or a frequency shift threshold can be set to correspond to when the vehicle is somewhere in a range between 85° and 90° relative to the source, in order to trigger a ranging operation between the vehicle and the first device.

Thus, a Doppler shift may be either positive or negative, where a positive Doppler shift indicates that the vehicle 140 is approaching the wireless AP, and a negative Doppler shift indicates that the vehicle is travelling away (or receding) from the wireless AP.

In the example above, the first device is a wireless AP, however, in some examples, the first device may be another type of device. For example, referring to FIG. 3, a vehicle 340 equipped with a computing device 510 may receive a signal from a wireless AP 350 or from a wireless device affixed to another vehicle 360. Thus, in some examples, the computing device 510 may receive one or more signals from different types of devices, including stationary devices, such as wireless APs or beacons, or moving devices, such as wireless transmitters affixed to vehicles, drones, or balloons. Further, in some examples, the computing device 510 may receive signals from a plurality of devices. For example, as may be seen in FIG. 3, the vehicle 340 receives signals from both a wireless AP 350 and a wireless transmitter coupled to a suitable computing device, such as computing device 510, affixed to another vehicle 360. A computing device 510 of the vehicle 340 may then determine Doppler shifts of each received signal.

Figure 2:
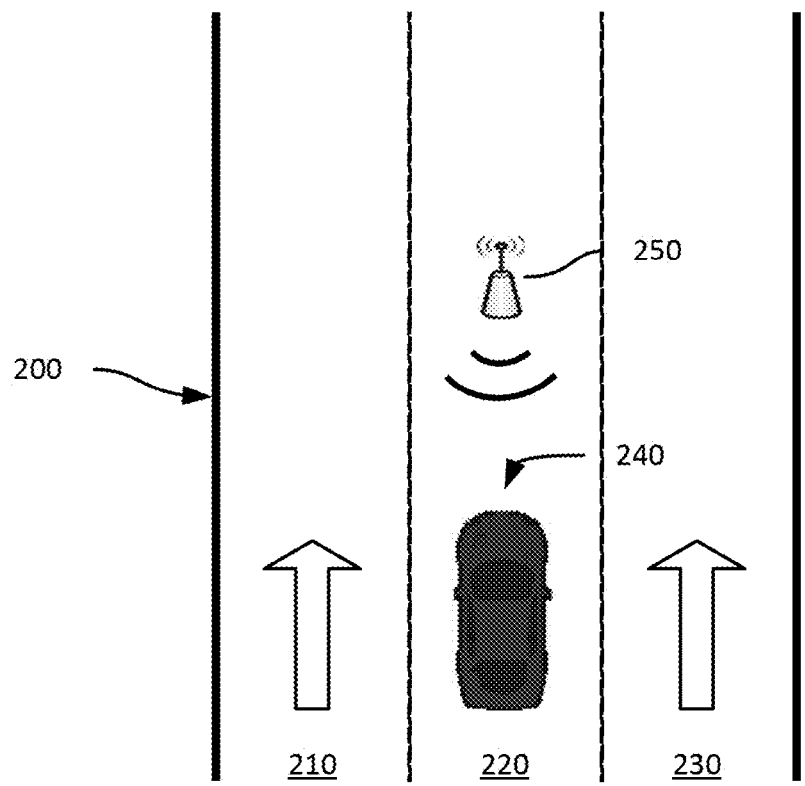

Referring again to FIGS. 1A-1B, in this example, the wireless AP 150 is located at the side of the road 100. However, other configurations may be employed. For example, referring to FIG. 2, a wireless AP 250 may be positioned above a road surface, such as on a sign or light. In the example of FIG. 2, the wireless AP 250 is attached to a sign structure that spans at least a portion of the road, and the wireless AP 250 is located over the middle lane 220 of the three lanes of travel 210-230. In other examples, the wireless AP 250 may be located above different lanes of travel, or may be located in a median between two road surfaces.

Figure 3:
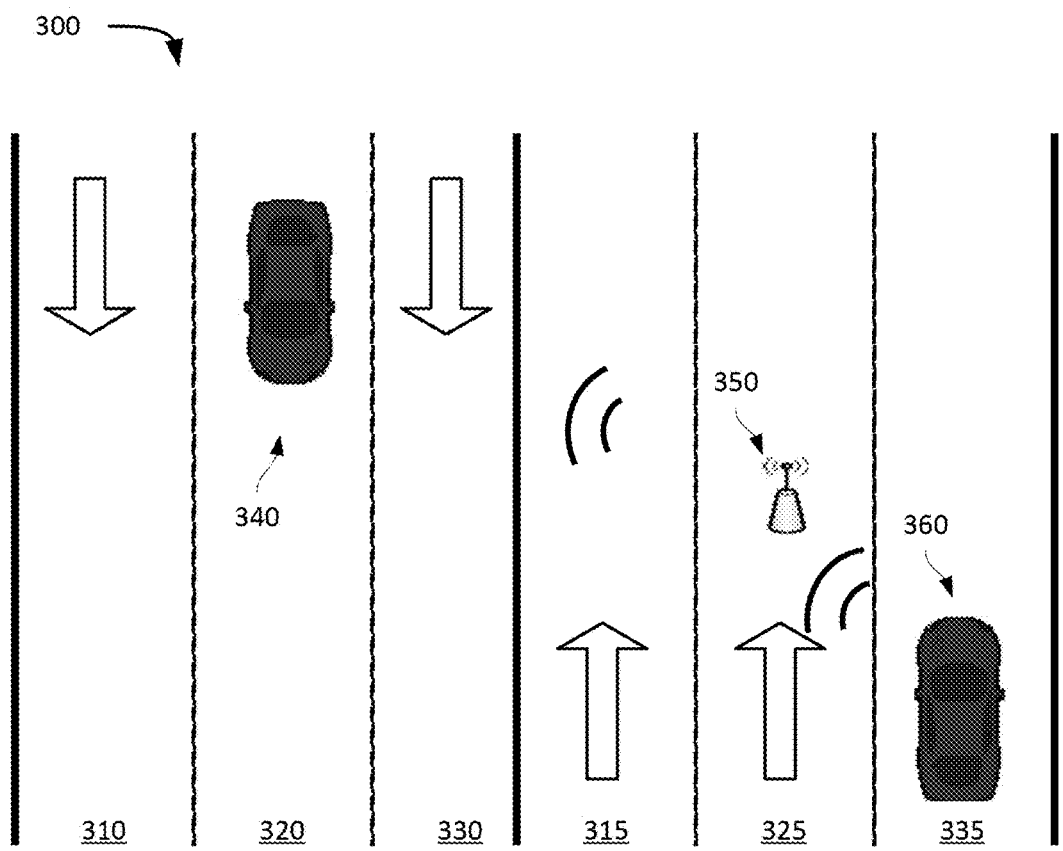
Figure 4:
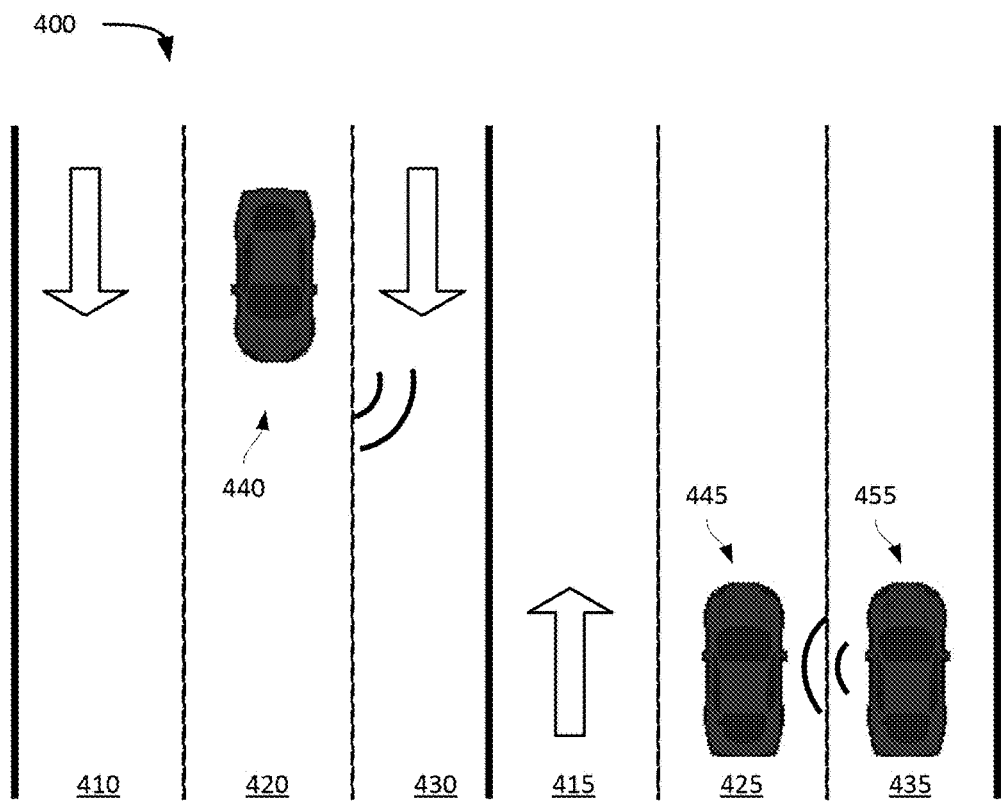

Referring again to FIG. 3, FIG. 3 illustrates another example configuration of devices. In this example, a wireless AP 350 is positioned on a structure, such as a sign, above a lane of travel 325. In addition, a vehicle 350 travelling in the opposite direction of travel as vehicle 340 is equipped with a wireless transmitter, such as a wireless transmitter of computing device 510, and is configured to transmit a signal that is received by vehicle 340. After receiving the transmitted signals, the vehicle 340 determines a Doppler shift of one or more of the received signals. FIG. 4 shows another example that does not include a wireless AP, but instead, vehicles 440 and 455 are equipped with wireless transmitters that transmit signals that are received at vehicle 445 by a computing device, such as computing device 510, which determines a Doppler shift of signals received from the vehicles 440, 455.

In some examples, the computing device 510 may also determine other information, in addition to Doppler shift. For example, the computing device 510 may determine or receive information indicating the speed of the vehicle, the heading of the vehicle, the location of the vehicle's antenna 520, or other information. The computing device may employ such information to determine a lane of travel according to this or other example methods. For example, if the computing device receives the vehicle's speed, the computing device 510, based on Doppler shift and the vehicle's speed, the computing device 510 may determine a relative velocity with respect to the first device. For example, the vehicle 140 may determine a Doppler shift that corresponds to an approach velocity of 150 miles per hour, but based on the vehicle's current speed of 75 miles per hour, may determine that the first device is itself travelling at 75 miles per hour towards the vehicle 140. Such information may be employed when determining a lane. For example, such a determination may help differentiate between vehicles travelling in the same direction as the vehicle 140 and those travelling in the opposite direction.

In some examples, the computing device 510 may determine an angle of arrival ("AOA"). For example, the wireless AP 350 shown in FIG. 3 is positioned above a lane of travel. Thus, determining a distance to the wireless AP 350 may not provide sufficient information to accurately determine a lane of travel. For example, if the location of the device is not known, the computing device 510 may be configured to compute a distance to the device based on the assumption it is located on the side of the road, rather than above a lane. Such an assumption could cause undesirable results. Thus, in some examples, the computing device 510 may determine an AOA towards the device to determine the device's location with respect to a road surface, which may affect calculation of a distance, as discussed in more detail below.

As discussed above, a frequency shift of a signal results from relative motion between a transmitter and a receiver. Referring again to FIG. 1A, as the vehicle 140 travels down a lane 120 of the road 100 and approaches the wireless AP 150, the computing device 510 detects a frequency shift that increases the frequency of the received signal. In this example, the computing device 100 then compares the magnitude of the frequency shift against a threshold value. In one example, with a car travelling towards an AP at 65 miles per hour (mph) where the source frequency is 5.85 GHz, if the magnitude of the frequency shift is less than the threshold value, e.g., 150, 100, or 50 Hz, the computing device 510 determines a distance to the first device. In this example, the computing device 510 determines the magnitude of the frequency shift by computing its absolute value.

In some examples, rather than comparing the magnitude of a frequency shift, the computing device 510 determines a percentage of change in frequency relative to the source frequency. The percentage change in frequency may then be compared to a threshold. If the percentage change in frequency is less than the threshold, e.g., 25 ppb, 16.8 ppb, or 8.4 ppb, the computing device 510 determines the a distance to the first device. In different examples, different thresholds may be employed. For example, a threshold may be based on a vehicle's speed or a location of the computing device or antenna on the vehicle. In implementations with one or more thresholds, at least one of the one or more thresholds can be based upon the vehicle's speed. In some examples, the threshold may be based on the number of lanes on the road, the curvature of the road, the width of the lanes on the road, or other features of the road or driving surface.

In some examples, other types of thresholds may be used. For example, a threshold may employ two values, one positive and one negative. In such an example, the determined frequency shift is compared to both values to determine whether it falls within the range between the two threshold values. For example, if the frequency shift is positive, the computing device 510 may be approaching the first device, while if the frequency shift is negative, the computing device 510 may be receding from the first device. One such example may allow for the computing device 510 to determine a distance even after it has slightly passed the first device.

In some examples, the computing device 510 may use multiple thresholds. Multiple thresholds may be used, for example, to help ensure that a distance measurement is made based on the computing device 510 truly travelling past the first device. For example, if the computing device 510 is affixed to a vehicle that is in stop-and-go traffic, the vehicle may stop, resulting in no detected frequency shift of the source frequency; however, the vehicle has not passed the first device, and may not even be at its closest point of travel with respect to the first device. Thus, the computing device 510 may employ a first threshold related to a frequency shift of the source device being sufficiently low, e.g., within 8.6 ppb, 5.8 ppb, or 3 ppb of the source frequency, and a second threshold related to when the frequency shift begins increasing over time, which indicates that the computing device 510 is receding from the first device, i.e., the computing device has passed the first device. Thus, in some examples, the computing device 510 may only determine a distance to the first device upon both thresholds being satisfied.

In some examples, a threshold may be based on a relative approach speed between the vehicle 500 and the first device.

For example, the calculated Doppler shift may be converted to a speed, e.g., in meters per second or miles per hour, which may then be compared against one or more thresholds. In some example, the computing device 510 may receive information from the first device. For example, the first device may be affixed to another vehicle and may provide information about the other vehicle's speed and direction of travel. Such information may be employed to determine a relative approach speed between the two vehicles. The relative approach speed may then be used to determine at least one of the one or more thresholds discussed above In response to determining that the Doppler shift is within the threshold, the computing device determines a distance to the first device. Referring to FIG. 1B, the vehicle's direction of travel 142 is approximately orthogonal to the path 152 of a signal received from the wireless AP 150, thus the determined Doppler shift is near zero. Further, a distance between the vehicle 140 and the wireless AP 150, while the vehicle is approximately alongside the wireless AP, may indicate the vehicle's approximate position within the width of the road 100.

To determine a distance to the wireless AP, the computing device 510 may use one or more different positioning techniques based on one or more received signals. For example, the computing device 510 may determine a time of arrival ("TOA") of a radio signal. In one such example, the computing device 510 receives a transmission time from the wireless AP and determines a time at which the signal was received by the computing device 510 based on a common time base, such as a GNSS time base like the Global Positioning System ("GPS") or the Global Orbiting Navigation Satellite System ("GLONASS"), to which the computing device 510 and the wireless AP 140 are synchronized. The computing device 510 can then determine the distance by multiplying the speed of light by the difference between the time of arrival and the transmission time. In some examples, the computing device 510 may determine a round-trip time ("RTT") for communications between the computing device 510 and the wireless AP. For example, the computing device 510 may transmit a message, e.g., a "Ping" message, to the wireless AP 150 and measure the time until a response message is received from the wireless AP 150.

In some examples, the computing device 510 may determine a distance to the first device based on an AOA with respect to the first device, which may have been previously determined as discussed above. Angle of attack may affect a distance calculation. For example, a vehicle travelling in lane 310 will measure a distance that is the hypotenuse of a right triangle formed by the lateral distance along the road surface from the hypothetical car to a point directly beneath the wireless AP 350, and the vertical distance from the road surface to the wireless AP 350. To determine a lane of travel, the vehicle may determine the lateral distance to the wireless AP 350, e.g., by using Pythagorean's theorem based on the computed distance and the AOA, i.e., by dividing the calculated distance by the cosine of the AOA. The calculated distance may indicate a number of lanes of separation to the wireless AP 350, even if the location of the wireless AP 350 is not known. Such information may then be used to determine a lane of travel for the vehicle.

In some examples, such as shown in FIGS. 3 and 4, the computing device 510 may receive signals from more than one device. Thus, the computing device 510 may separately determine a distance to each device. It should be noted that the separately determined distances need not be determined simultaneously. For example, with reference to FIG. 3, in an example where the computing device 510 in vehicle 340 receives signals from a wireless AP 350 and another vehicle 360, the computing device 510 may determine a distance to the wireless AP 350 at a first time and determine a distance to the other vehicle 360 at a second time, where the first time and the second time are determined based on the determined Doppler shifts with respect to the respective wireless AP 350 or other vehicle 360. In other words, the vehicle 340 may pass alongside the wireless AP 350 at a different time than it passes the other vehicle 360. However, the computing device 510 may store the respective determined distances for later use, such as to determine a lane of travel of the vehicle 340.

After determining a distance to the first device, the method 800 proceeds to block 830.

At block 830, the computing device 100 determines a lane in which the vehicle is operating based on the distance and a lane map. In one example, the computing device 510 accesses a lane map that includes information about the road on which the vehicle is travelling. For example, a lane map may include information about a number of lanes on the road, a number of directions of travel, a number of lanes per direction of travel, width of the road, width of lanes on the road, the width of the road for each direction of travel, the locations and sizes of shoulders on the road surface, or other information. In some examples, the lane map may include information about location of wireless APs and their relative position with respect to a road surface or one or more lanes of travel. Alternatively, information about locations of wireless APs may be accessed from a data store within the computing device 510 or from another data store, such as provided by a wireless AP service provider, a crowdsourcing service, or other mapping service. The lane map may be accessed at any time before, during or after performing the steps of the method 800. For example, the computing device may access the lane map to obtain information about the road for another purpose, e.g., navigation, and that accessed information may then be later used when the executed method reaches block 830.

A lane map may comprise any suitable format, such as a flat file or a database, and may include any suitable information. For example, a lane map may have a number of rows, each row corresponding to a location and indicating a number of lanes and a width of the lanes. In some examples, a lane map may include information indicating locations and a number of lanes between successive locations. In some examples, a lane map indicates distances to an infrastructure wireless AP for each of the lanes on the road or a height of an infrastructure wireless AP above a road surface.

In some examples, a lane map may include vehicle-specific information, such as locations of computing devices factory-installed in particular models of cars, or information about the dimensions of specific makes and models of vehicles. Such information may be used, for example, in conjunction with information describing the location of the computing device's antenna on the vehicle in determining a distance from a signal source. Other examples may include combinations of any of the foregoing information or other information that may be employed in various example systems or methods according to this disclosure.

Referring again to FIG. 1A, an example lane map for the road 100 indicates that the road 100 has three lanes 110-130 for one direction of travel. The lane map also indicates that each lane is 15 feet wide. Based on this information, the computing device 510 may determine a lane of travel. For example, if the computing device 510 determined that the distance to the wireless AP 150 was approximately 34 feet, the computing device 510 accesses the lane map and determines that the lane widths are 15 feet. In addition, the computing device 510 determines that the wireless AP 150 is located 10 feet from the road 100. For example, the computing device may receive location information of the wireless AP, such as GNSS coordinates or position information with respect to a road surface. Thus, the computing device determines that, at 34 feet from the wireless AP 150, the vehicle 140 is travelling in the middle lane 120. To make such a determination, the computing device 510 first subtracts the distance of the wireless AP 150 from the road, or 10 feet, from the determined distance between the vehicle 140 and the wireless AP 150, leaving 24 feet. The computing device 510 then divides 24 feet by the width of the lane, or 15 feet. The result is approximately 1.53, which indicates that the vehicle 140 is located approximate 1.53 lane widths from the edge of the road, i.e., the vehicle 140 is travelling in the middle of the second lane 120.

In some examples, the lane map may instead include crowdsourced information indicating previously-determined distances from the wireless AP. For example, a computing device 510 may report a determined distance for a particular wireless AP to a crowdsourcing server 782. Over time, the crowdsourcing server 782 may obtain such information from a number of computing devices and generate a statistical representation of the road. For example, referring to the chart 900 shown in FIG. 9, the chart 900 represents a hypothetical example of determined distances received by a crowdsourcing server 782 for the road 100 of FIGS. 1A-1B. On the chart shown in FIG. 9, the x-axis represents the determined distance in feet, while the y-axis represents the number of reports received. In the illustrated implementation, the crowdsourcing server 782 receives the determined distances and maintains counts at increments of one foot. Thus, after receiving a reported determined distance of 34 feet for a particular wireless AP, the crowdsourcing server 782 logs the report and increments a count corresponding to 34 feet. Over time, as reports are received, the counts may provide an indication of the location of lanes on a road.

Figure 9:
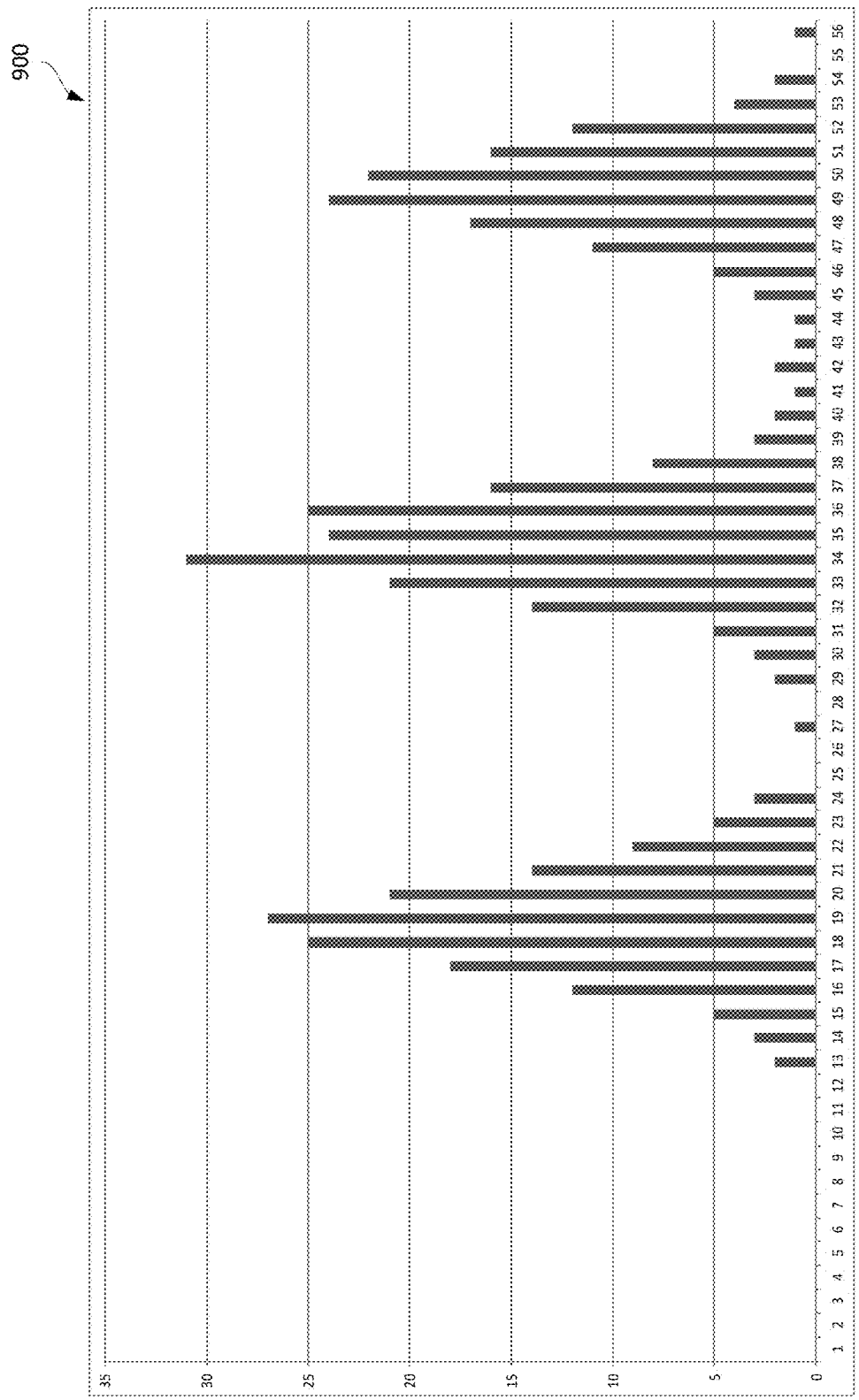
FIG. 9 shows an example chart showing hypothetical crowdsourced information for autonomous lane detection.

In the example shown in FIG. 9, the chart 900 indicates peaks corresponding to distances between approximately 17-20 feet, 33-37 feet, and 48-51 feet, which may correspond to three lanes of travel on a road having lanes approximately 15 feet wide and with a shoulder of approximately 10 feet. Thus, in some examples, the crowdsourcing server 782 may respond to a reported determined measurement with an estimated lane of travel based on the crowdsourcing information. For example, the crowdsourcing server 782 may determine a distance between the peaks by identifying a midpoint of each peak and determining a difference in distance between each neighboring peak.

In one such example, the computing device 510 determines the lane of travel by sending the determined distance to the crowdsourcing server 782 and receiving a lane of travel from the crowdsourcing server 782. The crowdsourcing server 782 may determine a lane of travel based on the received distance from the vehicle and one or more peaks present in the crowdsourced information with respect to the respective wireless device. The computing device 510 may then compare the received lane of travel information with information provided by the lane map to confirm that the determined lane of travel corresponds correctly with the information provided by the lane map. For example, the computing device 510 may confirm that, if the determined lane of travel is lane 3, the road has at least three lanes of travel at the location. In some examples, rather than providing an estimated lane of travel, the crowdsourcing server 782 may instead provide estimated lane widths based on the crowdsourcing information or raw data stored in its data store 784. The computing device 510 may then determine a lane of travel based on the estimated lane widths received from the crowdsourcing server and the number of lanes of travel from the lane map.

In some examples, the crowdsourcing server 782 may provide assistance information to a computing device 510 as it travels along a road. For example, a vehicle travels into the range of a wireless access point and the vehicle's computing device 510 begins communicating with the wireless access point. The computing device 510 then transmits a request for assistance data to the crowdsourcing server 782. The crowdsourcing server 782 responds to the request by providing location information of the wireless access point, as well as location information for the next N wireless access points for a given distance, for example along the next five miles of road in the vehicle's direction of travel. The computing device 510 receives the assistance data and stores it in memory for subsequent use when making a lane determination. Further, as the vehicle continues to travel along the road, it may receive updated assistance data from the crowdsourcing server 782. And while these examples relate to a crowdsourcing server 782, such assistance data may be provided by other systems, such as cellular networks or a provider of one or more wireless access points.

In some examples, the vehicle 140 may determine a lane of travel in part on whether the first device is apparently stationary, travelling in the same direction as the vehicle 140, or travelling in an opposite direction as vehicle 140. As discussed above, the computing device 510 may make such a determination based on the Doppler shift and the speed of the vehicle 140. The computing device 510 may employ such information to determine a lane of travel for the vehicle 140 by determining candidate lanes for the vehicle based on a lateral distance to another vehicle. For example, if the first device is a vehicle travelling on the road 100, and if the computing device 510 determines that the distance to the first device is approximately one lane width and the other vehicle is travelling in the same direction as the vehicle 140, the vehicle 140 may be unable to determine its lane as it may be located in any of the three lanes. This may be because regardless of which lane it is in, it may be adjacent to the other vehicle. Thus, more information may be required based on distances to other devices, or the computing device 510 may discard the calculated distance and retry at a later time when different devices are available. However, if the other vehicle is determined to be travelling in an opposite direction, as described above, and is only one lane width away from the vehicle 140 the vehicle may determine it is in the left-most lane, as that is the only lane that is adjacent to a lane of traffic in the opposite direction.

After determining the lane of travel, the computing device 510 may provide the lane information to the vehicle's navigation system, or may provide an alert to the user, such as via a heads-up display, by displaying the lane information on the computing device's display, or with an audible or tactile effect. In some examples the computing device 510 may communicate with, or be a part of, an autonomous driving system of a vehicle, though in other examples, the vehicle may be manually operated and the computing device 510 may provide lane determination indications to the operator of the vehicle.

Figure 10:
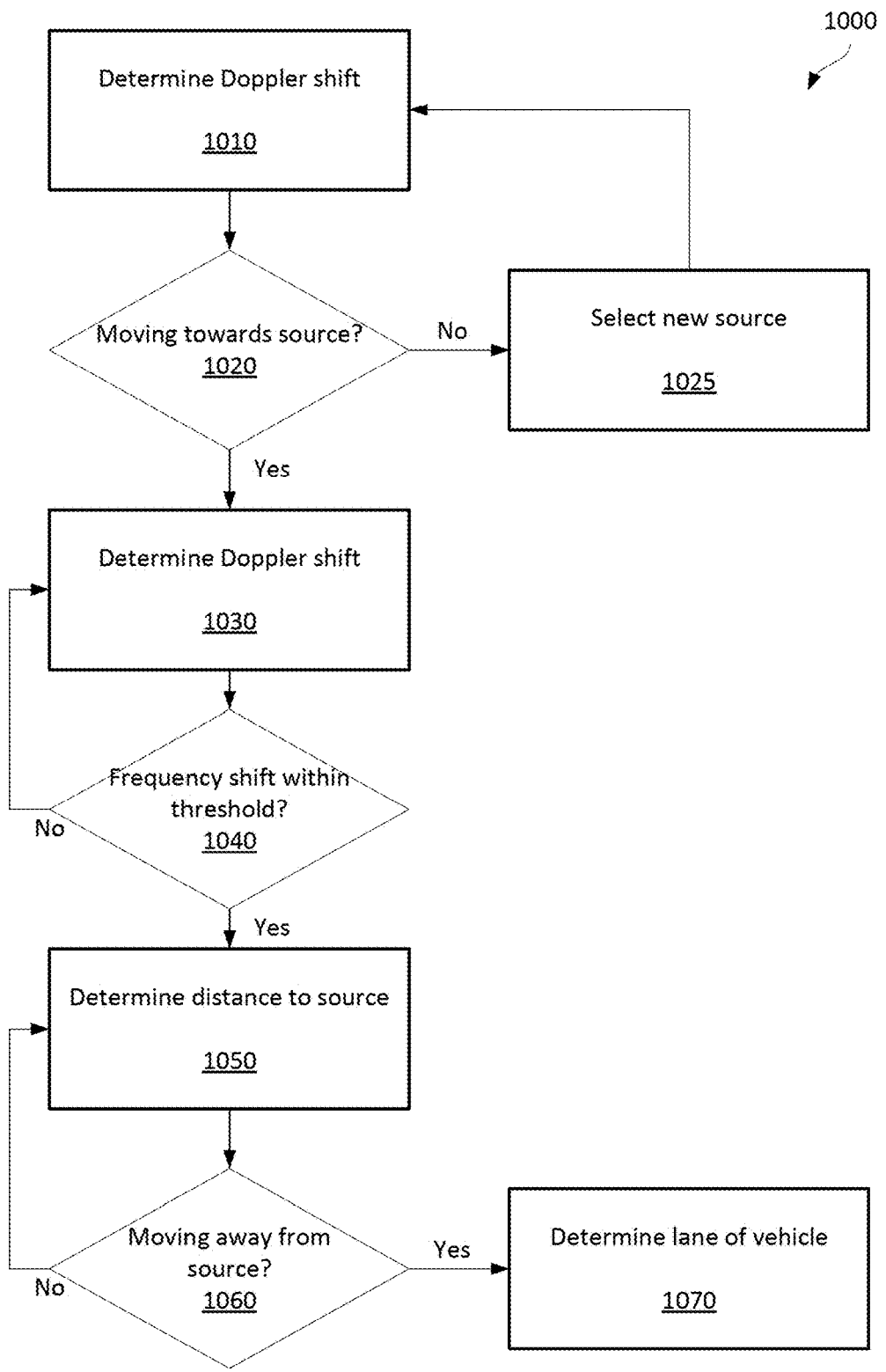
FIGS. 10-11 show example methods for autonomous lane detection.

Referring now to FIG. 10, FIG. 10 shows an example method 1000 for autonomous lane detection. Reference will be made to the computing device 510 of FIGS. 5 and 6, however, any suitable example system according to this disclosure may be employed.

At block 1010, the computing device 510 determines a Doppler shift of a signal received from a first device as described above with respect to the method 800 of FIG. 8. It is understood that the method 800 of FIG. 8 does not require that a Doppler shift be computed directly, since a measured received frequency of a signal can be compared to the source frequency of the signal which can then be compared to a threshold without computing the Doppler shift.

At block 1020, the computing device 510 determines whether it is moving towards the source of the signal. If so, the method proceeds to block 1030, otherwise it proceeds to block 1025. In this example, the computing device 510 determines whether the Doppler shift is positive or negative, or whether the received frequency is greater than or less than the source frequency of the signal.

At block 1025, the computing device 510 disregards the first device and searches for a signal from another device. For example, the computing device 510 may scan one or more frequency bands, such as frequency bands in 802.11p frequency band of approximately 5.85-5.925 GHz, to identify other signals. The computing device 510 may disregard signals having a signal strength below a threshold, such as signals having a signal strength below, e.g., −60 or −70 dB. After identifying a new signal source, the method returns to block 1010.

At block 1030, the computing device 510 may again determine the Doppler shift for the first device as discussed above with respect to the method 800 of FIG. 8. However, in some examples, the Doppler shift is not re-determined the first time the method 800 reaches block 1030 from block 1020.

At block 1040, the computing device 510 determines whether the Doppler shift is within a threshold as discussed above with respect to the method 800 of FIG. 8. If the Doppler shift is within the threshold, the method 1000 proceeds to block 1050, otherwise, it returns to block 1030 to re-determine the Doppler shift. In some examples, the computing device 510 may wait a duration before returning to block 1030. For example, the computing device 510 may pause for a period of approximately 1 second before returning to block 1030. Such a delay may decrease the processing requirements of the computing device 510. In some examples, the computing device 510 may employ a variable delay period. For example, the computing device 510 may vary the delay period based on the Doppler shift or changes in the Doppler shift. If the Doppler shift is high (assuming the vehicle is travelling at highway speeds), e.g., greater than 100 ppb of the source frequency (or alternatively, greater than 90 ppb or 75 ppb), the computing device 510 may select a delay period of 1 second, as it is likely that the vehicle is far enough away from the first device that frequent sampling of the Doppler shift is not needed. As the Doppler shift gets smaller, i.e., as the vehicle approaches the first device, the computing device 510 may decrease or eliminate the delay period.

Although the car may be going at a constant speed, as it gets closer to the first device, the component of the velocity in a direction parallel to a line segment connecting the vehicle with the second device becomes smaller and smaller (and hence the Doppler shift becomes less and less). Hence, as the Doppler shift gets smaller, the delay period also gets shorter. For example, the computing device 510 may establish one or more thresholds corresponding to different delay periods. The computing device may then use a delay period corresponding to the threshold that best corresponds with the then-current Doppler shift. In some examples, the computing device 510 may use a delay period that decreases to zero, or a short period (e.g., 10 milliseconds), linearly from a maximum delay period based on the determined Doppler shift.

At block 1050, the computing device 510 determines a distance to the first device as described above with respect to the block 820 of the method of FIG. 8.

At block 1060, the computing device 510 again measures the Doppler shift and determines whether the vehicle is moving away from the first device. While it is not moving away from the first device, the method 1000 returns to block 1050 and re-determines the distance to the first device. If the vehicle is moving away from the first device, the method 1000 proceeds to block 1070. In some examples, the transition from moving towards the first device to moving away from the first device indicates that the vehicle has passed the first device and thus, the currently-computed distance may reflect a close approximation to the true distance between the vehicle and the first device. In some examples, a determined distance shortly before the transition may be used with a determined distance shortly after the transition to interpolate an approximate distance to the first device. For example, if an approximately constant speed is assumed, the computing device may use linear interpolation based on the determined distance before and after the transition to determine a distance at an interpolated time when the Doppler shift was zero.

At block 1070, the computing device determines a lane of travel of the vehicle as discussed above with respect to block 830 of the method 800 of FIG. 8.

It should be noted that while the methods 800, 1000 of FIGS. 8 and 10 have been described in the context of receiving a signal from one device, examples of each method 800, 1000 are suitable for determining a lane of travel based on received signals from a plurality of devices. For example, in a scenario where no known stationary signal source, e.g., an infrastructure wireless AP, is available, the computing device 110 may use a plurality of devices to determine a lane of travel. In one example, the computing device 110 may receive signals transmitted by computing devices in a plurality of other vehicles or from stationary wireless transmitters whose location is not known. In one such example, signals from multiple vehicles may be used due to uncertainties that may arise if only a single vehicle signal source is used. In some examples, the computing device 510 may use both stationary and moving devices, or multiple stationary devices, to determine a lane of travel for the vehicle.

For example, referring again to FIG. 3, if the vehicle 340 receives signals form vehicle 360, but not from the wireless AP 350, (e.g., the wireless AP 350 is disabled or is not present), when vehicle 340 determines a distance to vehicle 360, ambiguity may arise regarding the lane of travel for vehicle 340 if the position of vehicle 360 is not known. For example, in FIG. 3, the two vehicles 340 and 360 are separated by three lane widths, but because the road 300 has six lanes, at least two scenarios are possible from such a determination: (1) vehicle 340 is in lane 320 and vehicle 360 is in lane 335, or (2) vehicle 340 is in lane 310 and vehicle 360 is in lane 325. In each case, the vehicles 340, 360 are separated by three lanes. Thus, the use of additional signal sources may be needed in some examples to resolve such ambiguities. In some cases two devices may be sufficient, however, the number of signals sources needed to determine a lane for a vehicle may depend on the number of lane configurations that are possible based on the relative distances between the various signal sources. For example, some roads may have a large number of lanes, e.g., 3+ lanes in each direction, which may result in a significant number of relative lane positions between different vehicles.

For example, referring to FIG. 4, the arrangement of vehicles 440, 445, 455 on the road 400 does not resolve the ambiguity discussed above because there are at least two scenarios that correspond to the relative placement of the vehicles 440, 445, 455: (1) vehicle 440 in lane 420, vehicle 445 in lane 425, and vehicle 455 in lane 435, and (2) vehicle 440 in lane 410, vehicle 445 in lane 415, and vehicle 455 in lane 425. Thus, vehicle 440 may not be able to determine its lane of travel in such a scenario either. Instead, vehicle 440 may attempt to determine its relative position based on signals received from additional devices.

Figure 11:
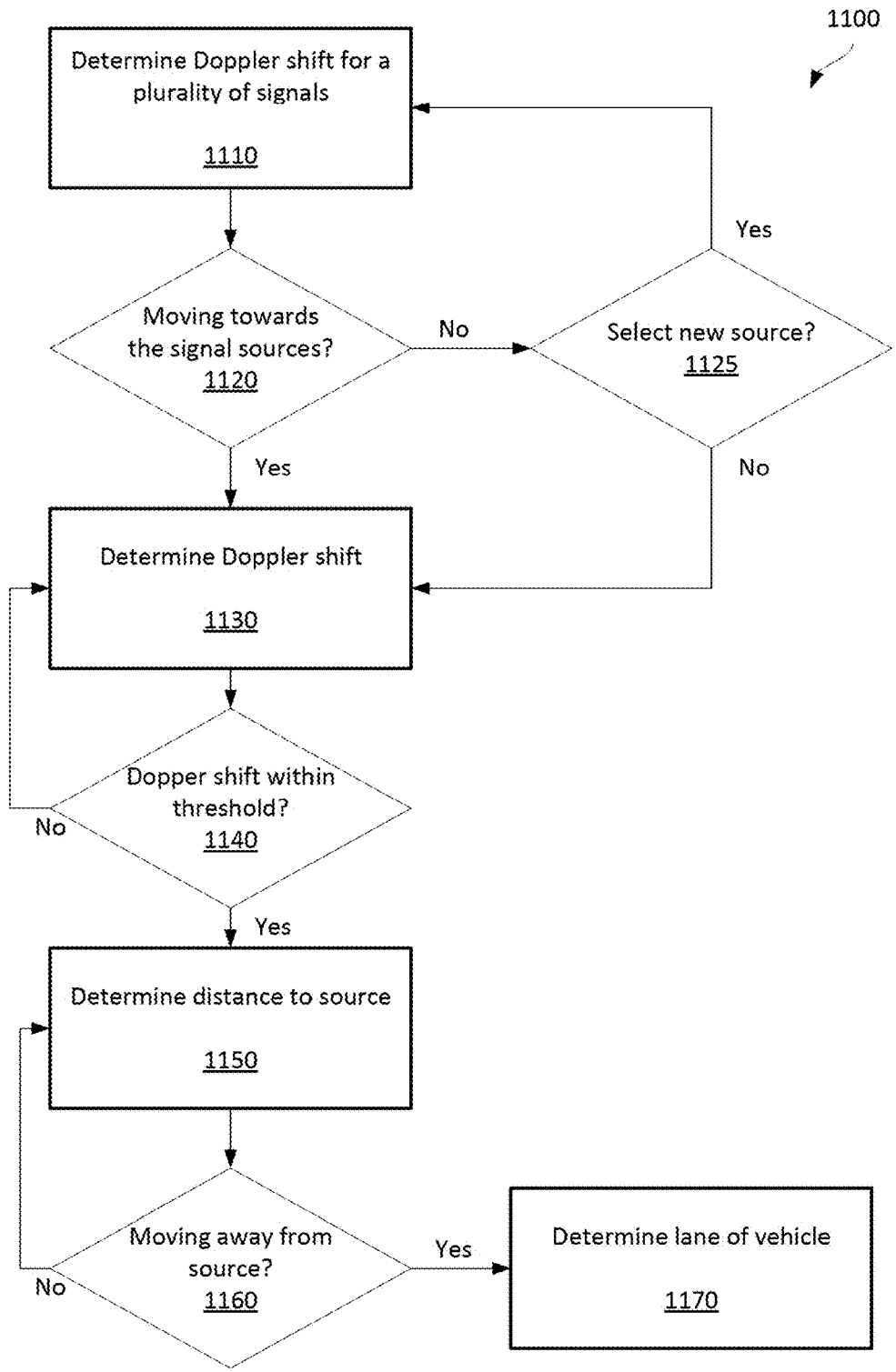

Referring now to FIG. 11, FIG. 11 shows an example method 1100 for autonomous lane detection. The method 1100 of FIG. 11 involves receipt of signals from a plurality of devices; however, it should be noted that other methods according to this disclosure, such as the methods 800, 1000 of FIGS. 8 and 10 may be employed when multiple devices transmit signals that may be received by a suitable computing device. This example method is provided to as an example to illustrate the use of signals received from a plurality of device for autonomous lane detection. Reference will be made to the computing device 510 of FIGS. 5 and 6, however, any suitable example system according to this disclosure may be employed.

At block 1110, the computing device 510 determines a Doppler shift for each signal from a plurality of devices. The computing device 510 in this example computes a Doppler shift as described above with respect to block 810 of the method 800 of FIG. 8. Thus, for each device from which a signal is received, the computing device determines a Doppler shift for the signal. In some examples, however, the computing device 510 may first filter signals received from other devices, such as based on signal strength or multi-path issues. For example, if a signal strength is weak, it may represent a wireless device that is too far away to be effectively used to determine a lane of travel. Further, if multi-path issues are detected, the device may not serve as a reliable source of distance information. In some examples, devices may be filtered as being unrecognized, e.g., based on an identification number associated with the device. For devices that have been filtered, the computing device 510, in some examples, may not determine a Doppler At block 1120, the computing device 510 determines, for each of the plurality of devices, whether the computing device 510 is travelling towards the respective device. If the computing device 510 determines that it is travelling towards one or more of the devices, the method 1100 proceeds to block 1130 with respect to those devices; however, if the computing device 510 determines that it is travelling away from one or more of the devices, the method proceeds to block 1125 with respect to those devices. Thus, at block 1120, the method 1100 may continue down two different paths simultaneously (or substantially simultaneously). The processing may be substantially simultaneous in the sense that the computing device may process the signals individually and serially. Thus, the computing device 510 may proceed to block 1130 with respect to a first signal and perform block 1130, before processing a second signal at block 1120 and proceeding to block 1125, and then returning to the first signal at block 1130, and so forth. Such processing may enable the computing device to obtain distance information from different devices as the vehicle passes them, which may occur at different times.

At block 1125, the computing device 510 determines whether a new signal source should be acquired to replace one or more of the devices that the computing device 510 is travelling away from. For example, if the computing device 510 is configured in a particular setting to use two devices, but has calculated Doppler shifts for signals from three devices, the computing device 510 may stop using signals received from the device that the computing device is travelling away from, and proceed to block 1130 and continue using signals from the other two devices without finding a new source to replace the third device. However, if the number of devices that the computing device is travelling towards drops below a minimum number, the method 1100 searches for alternate devices that are transmitting signals and returns to block 1110. However, in some examples, the method 1100 may proceed with respect to the available devices while the computing device 510 continues to search for other devices.

At block 1130, the computing device 510 determines a Doppler shift for received signals from devices that have not been eliminated at block 1125 as discussed above with respect to block 1030 of the method 1000 of FIG. 10. Further as discussed above, in some examples, the Doppler shift is not re-determined the first time the method 1000 reaches block 1130 from block 1020.

At block 1140, the computing device 510 determines whether the Doppler shift for each received signal satisfies a threshold value as discussed above with respect to block 1040 of the method 1000 of FIG. 10. In this example, the computing device 510 is analyzing a plurality of signals, and thus each signal must be processed with respect to the threshold (or thresholds). Thus, it may be that in some cases a first subset of the signals satisfies the threshold (or thresholds), while a second subset of the signals does not. In such a circumstance, the method 1100 may proceed to block 1150 with respect to each signal of the first subset of signals, but return to block 1130 with respect to each signal of the second subset of signals. Thus, the method 1100 may proceed down different processing paths substantially simultaneously, as discussed above.

At block 1150, the computing device 510 determines the distance to each device from which it is processing a signal as a part of executing the method 1100 as discussed above with respect to block 830 of the method 800 of FIG. 8.

At block 1160, the computing device 510 determines whether it is moving away from the device that is the source of the signal as discussed above with respect to block 1060 of the method 1000 of FIG. 10. As discussed above, in this example, the computing device 510 is analyzing a plurality of signals, and thus each signal must be processed with respect to block 1160 individually. For example, it may be that in some cases, the computing device 510 is travelling away from a first subset of the devices while the computing device 510 is not travelling away from a second subset of the signals. In such a circumstance, the method 1100 may proceed to block 1170 with respect to each device of the first subset of devices, but return to block 1150 with respect to each device of the second subset of devices. Thus, the method 1100 may proceed down different processing paths substantially simultaneously, as discussed above.

At block 1170, the computing device 510 determines a lane of travel of the vehicle. In this example, because the computing device 510 is processing signals from a plurality of devices, it may need to delay determining the lane of travel until sufficient information has been determined with respect to the plurality of devices. For example, the computing device 510 may determine candidate lanes in which the vehicle is travelling based on processing of a subset of the signals received from the plurality of devices, and make a final determination once it has received sufficient information to reduce the number of candidate lanes to a single lane.

Figure 12:
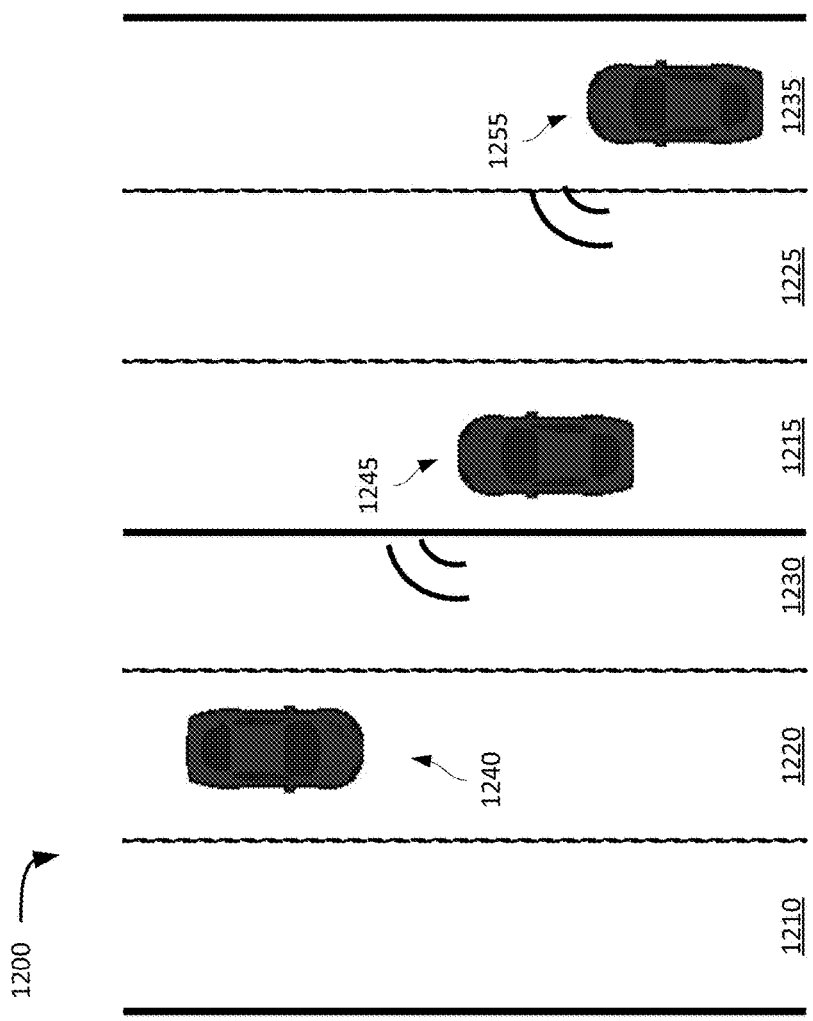
FIG. 12 shows an example road configuration for autonomous lane detection.

For example, referring to FIG. 12, the vehicle 1240 may receive signals from vehicles 1245 and 1255. It may complete an iteration of method 1100 with respect to vehicle 1245 first as it may pass by vehicle 1245 first. At which time, as can be seen in FIG. 12, based on the relative positions of vehicles 1240 and 1245, vehicle 1240 may determine candidate lanes as lanes 1220 and 1230, but eliminate 1210 from consideration, based on the one-lane separation between the two vehicles (and based on information about the direction of travel of the vehicles and the direction of travel for each lane in the lane map). At a later time, after vehicle 1240 passes vehicle 1255, it may further narrow the candidate lanes to lane 1220, as the only lane that satisfies the one-lane separation with vehicle 1245 and the three-lane separation with respect to vehicle 1255 is lane 1220.

Further, in some examples, the computing device 510 may determine a lane of travel based on other information, such as whether the vehicle 1240 is travelling in the same direction or a different direction as vehicles 1245 and 1255. For example, if the computing device 510 is able to determine the direction of travel of a moving signal source, as discussed above, the computing device 510 may be eliminate one or more ambiguities, as discussed above. In some examples, the computing device may also use other information, such as a location of an antenna 520 on a vehicle to determine a lane of travel. For example, if a vehicle has an antenna 520 located on a rear left corner of the vehicle, it may affect a determined distance from the vehicle to a signal source. Further, the location of the antenna on the signal source may also affect such a determination of a distance between a vehicle and a signal source. Thus, the computing device 510 access information indicating the location of the antenna 520 connected to the signal source, and introduce an offset from the mid-line of the vehicle to the antenna 520 when calculating a distance to a signal source. Similarly, if the computing device 510 obtains information, such as from a received signal, indicating the position of an antenna on a signal source, the computing device 510 may compensate for any offset of the antenna from the mid-line of the vehicle. In some examples, the computing device 510 may receive such offset information from the signal, in some examples, the computing device 510 may apply an average offset value, e.g., 3 feet, based on the average width of a vehicle or, e.g., 8 feet, based on an average length of a vehicle. Other average offset values may be employed, such as if the computing device receives information indicating a type of vehicle, e.g., a car, a truck, a van, etc. Each such type of vehicle may be associated with one or more average dimensions that may be employed to generate offsets usable when determining a lane of travel.

After completing block 1170, the method 110 may end, or it may return to block 1110. For example, the computing device 510 may lack sufficient information during the execution of the example method 1100. In such a case, the method 1100 may process signals received from available signal sources, and search for other signals sources to provide additional information to resolve one or more ambiguities. The method 1100 may search for such other signal sources while the method 110 is in progress, or after it has completed processing with respect to the available signal sources.

Further, the computing device may execute example methods according to this disclosure based on known locations of wireless APs, e.g., the computing device may schedule execution of a suitable method. In some examples, the computing device 510 may opportunistically execute one or more example methods based on one or more devices that are detected as transmitting one or more suitable signals for use with a method according to this disclosure.

Figure 13:
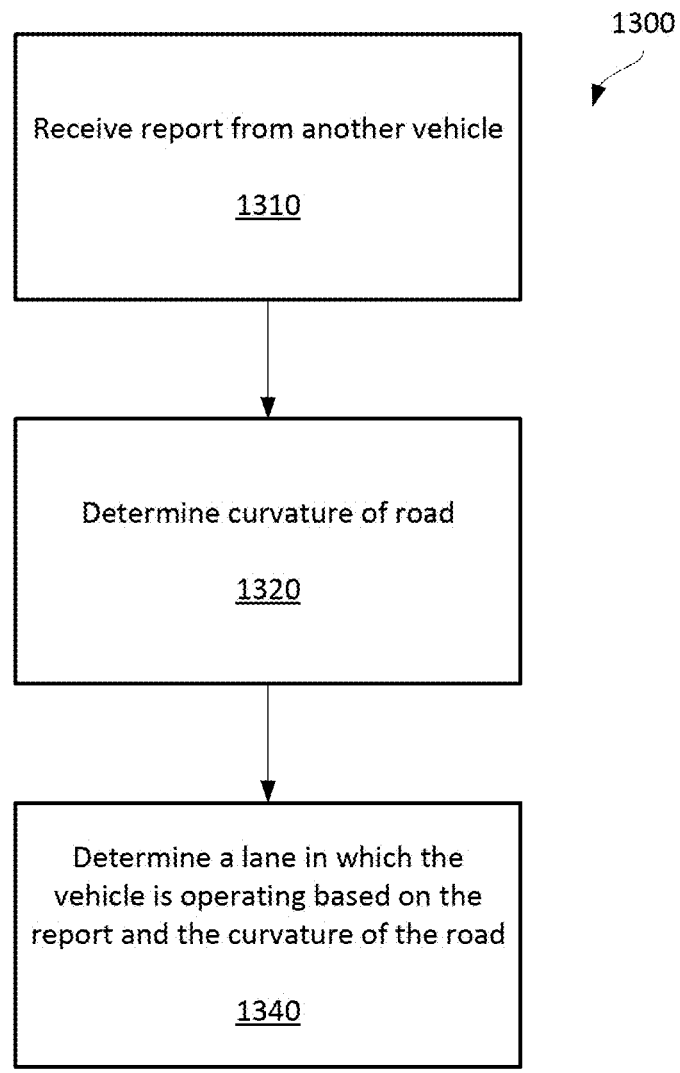
FIG. 13 shows an example method for autonomous lane detection.

Referring now to FIG. 13, FIG. 13 shows an example method 1300 for autonomous lane detection. Reference will be made to the computing device 510 of FIGS. 5 and 6, however, any suitable example system according to this disclosure may be employed.

The method 1300 of FIG. 13 begins at block 1310 when the computing device 510, affixed to a first vehicle, receives a report from a computing device affixed to a second vehicle. For example, the second vehicle may be travelling along the same road as the first vehicle and in the same direction as the first vehicle. In some examples, the first and second vehicles may establish a communications channel, e.g., via point-to-point communication, and exchange vehicle reports. A vehicle report may include information about the transmitting vehicle, such as its direction of travel, its speed, and its location. In some examples, the vehicle report may include the vehicle's current lane, if known, or information about the location of the computing device's antenna on the vehicle and vehicle dimension information.

At block 1320, the computing device 510 determines a curvature of the road the first vehicle is travelling on. Information about the curvature of a road may be determined from a lane map or from navigation information available from a navigation system of the first vehicle. In some examples, the computing device 510 may request road curvature information of the road from a remote source, such as a crowdsourcing system or a map service. In some examples, the computing device 510 may determine a net curvature of the road, or a net lateral offset between the first vehicle and the second vehicle based on a curvature of the road between the first and second vehicles.

To determine a road curvature, the computing device 510 may obtain one or more maps for a section of road between the first and second vehicles. The computing device 510 may then compute a net offset between the two vehicles or a an AOA between the two vehicles based on the one or more maps and the reported position of the second vehicle. Thus, the computing device 510 may in some examples not compute the literal curvature of the road, but rather a net offset or angle between the first and second vehicles resulting from one or more curves in the road.

At block 1330, the computing device 510 determines a lane of travel for the first vehicle based on the received report and the road curvature information. For example, if the road curvature information indicates no curvature, i.e., the road is straight between the two vehicles, the computing device 510 may determine a distance to the second vehicle and may determine an AOA to the second vehicle. Based on the determined distance and AOA, the computing device 510 may be able to determine an absolute lane of travel, or a relative lane of travel of the first vehicle with respect to the second vehicle. For example, if the AOA is zero, the computing device 510 determines that the first vehicle is travelling in the same lane as the second vehicle. If the received report included a lane of travel of the second vehicle, the computing device 510 may then determine the absolute lane of travel of the first vehicle. However, if the received report does not include a lane of travel of the second vehicle, the computing device 510 may request the lane of travel from the second vehicle, or it may determine a relative lane of travel based on the distance and the AOA.

In one example, the road bends to the right by approximately 30 degrees between the first and second vehicles. Based on the received report from the second vehicle, the computing device 510 measures the AOA to the second vehicle based on the received signal transmitting the second vehicle's report. The computing device 510 then subtracts the angle resulting from the 30 degree road curvature from the measured AOA. If the resulting corrected AOA is zero or within a threshold distance from zero, the computing device 510 determines that it is travelling in the same lane as the second vehicle. Otherwise, the computing device 510 determines an offset from the second vehicle and may be able to determine a relative or absolute lane of travel for the first vehicle. In some examples, additional information may be needed to resolve the first vehicle's lane of travel, which may be obtained according to one or more methods described herein.

In some examples, the computing device 510 may compute an angle to the second vehicle based on the signal received from the second vehicle when receiving the vehicle report. The computing device 510 may employ the following equation to determine the angle to the second vehicle:

$$\theta = \cos^{-1}\left(\frac{f_o v + f_s v}{f_s v_o - f_o v_s}\right)$$

Where $f_o$ is the frequency of the observed signal, $f_s$ is the source frequency, $v_o$ is the velocity of the observer, $v_s$ is the velocity of the source, and v is the speed of the wave (the signal) in the transmission medium (e.g., air). After computing the angle, the computing device subtracts the computed angle from the angle of curvature to the second vehicle to get the approximate angle between the two vehicles. As discussed above, if the angle between the two vehicles is zero or within a threshold distance of zero, the computing device 510 determines that the two vehicles are travelling in the same lane. Otherwise, it determines they are travelling in different lanes. As discussed above, additional information may be needed to resolve the first vehicle's lane of travel, which may be obtained according to one or more methods described herein.

In some examples, if a lane map is available, the computing device 510 may be able to determine a lane of travel further based on the lane map. For example, if the lane map indicates that the road has two lanes in the direction of travel of the first vehicle, and the received report indicates that the second vehicle is travelling in the same direction as the first vehicle, and the AOA or the computed angle indicates that the first vehicle is offset to the left of the second vehicle, the computing device 510 may determine that the first vehicle is travelling in the left lane and the second vehicle is travelling in the right lane.

In some examples, the computing device 510 may determine a lateral offset between the first vehicle and the second vehicle based on the distance information and an AOA to the second vehicle. For example, the road curves to the right and at the location of the second vehicle, the change in course is 50 feet to the right. Thus, if the determined offset to the second vehicle is approximately 50 feet (e.g., 50 feet, plus or minus 10%), the computing device 510 is able to determine that the first vehicle is travelling in the same lane as the second vehicle. And, as discussed above, if the received report indicates the lane of travel of the second vehicle, the computing device 510 uses the reported lane of travel as the lane of travel for the first vehicle. If the lateral offset is significantly different than 50 feet, e.g., 65 feet, the computing device 510 may determine that the first vehicle is travelling in a lane adjacent to the lane occupied by the second vehicle, thus obtaining a relative lane of travel. Again, if the received report indicates the lane of travel of the second vehicle, the computing device 510 can determine the lane of travel for the first vehicle.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

What is claimed is:

1. A method of lane detection for a vehicle, comprising:
receiving, via a wireless receiver of the vehicle, a signal from a first device;
determining, by a processor disposed within the vehicle and in communication with the wireless receiver, a time of the vehicle passing the first device at which a path of the received signal is approximately orthogonal to a direction of travel of the vehicle based on a comparison of a measured received frequency of the received signal to a source frequency of the received signal and to one or more thresholds;
determining, by the processor disposed within the vehicle and in communication with the wireless receiver, a distance from the vehicle to the first device based on at least one of a time of arrival ("TOA") or a round trip time ("RTT") of the received signal at or near the determined time of the vehicle passing the first device at which the path of the received signal is approximately orthogonal to the direction of travel of the vehicle; and
determining, by the processor disposed within the vehicle and in communication with the wireless receiver, a lane in which the vehicle is operating based on the determined distance and a lane map.

2. The method of claim 1, wherein determining the lane is further based on a direction of travel of the vehicle.

3. The method of claim 1, wherein determining the lane is further based on an angle of attack from an antenna of the vehicle to the first device, the antenna in communication with the wireless receiver.

4. The method of claim 1, wherein the first device comprises an infrastructure wireless access point.

5. The method of claim 1, wherein the vehicle is a first vehicle and the first device comprises a wireless device disposed within a second vehicle different from the first vehicle.

6. The method of claim 5, further comprising:
determining, by the processor, a location and a heading of the first vehicle; and
outputting, via the wireless receiver, to a crowdsourcing server, the location, the heading, and the determined distance to the first device.

7. The method of claim 1, wherein the lane map is received from a crowdsourcing server.

8. A non-transitory computer-readable medium comprising program code, the program code configured to be executable by a processor and to cause the processor to:
receive, via a wireless receiver of a vehicle, a signal from a first device;
determine, by a processor disposed within the vehicle and in communication with the wireless receiver, a time of the vehicle passing the first device at which a path of the received signal is approximately orthogonal to a direction of travel of the vehicle based on a comparison of a measured received frequency of the received signal to a source frequency of the received signal and to one or more thresholds;
determine, by the processor in communication with the wireless receiver, a distance from the vehicle to the first device based on at least one of a time of arrival ("TOA") or a round trip time ("RTT") of the received signal at or near the determined time of the vehicle passing the first device at which the path of the received signal is approximately orthogonal to the direction of travel of the vehicle; and
determine, by the processor disposed within the vehicle and in communication with the wireless receiver, a lane in which the vehicle is operating based on the determined distance and a lane map.

9. The computer-readable medium of claim 8, wherein the program code is further configured to cause the processor to determine the lane based on a direction of travel of the vehicle.

10. The computer-readable medium of claim 8, wherein the program code is further configured to cause the processor to determine the lane based on an angle of attack from an antenna of the vehicle to the first device, the antenna in communication with the wireless receiver.

11. The computer-readable medium of claim 8, wherein the first device comprises an infrastructure wireless access point.

12. The computer-readable medium of claim 8, wherein the vehicle is a first vehicle and the first device comprises a wireless device disposed within a second vehicle different from the first vehicle.

13. The computer-readable medium of claim 12, wherein the program code is further configured to cause the processor to:
determine, by the processor, a location and a heading of the first vehicle; and
output, via the wireless receiver, to a crowdsourcing server, the location, the heading, and the determined distance to the first device.

14. The computer-readable medium of claim 8, wherein the lane map is received from a crowdsourcing server.

15. A system configured to be mounted in a vehicle comprising:
an antenna;
a wireless receiver in communication with the antenna;
a non-transitory computer-readable medium; and
a processor disposed within the vehicle and in communication with the wireless receiver and the non-transitory computer-readable medium and configured to execute program code stored in the non-transitory computer-readable medium and to:
receive, via the wireless receiver of the vehicle, a signal from a first device;
determine a time of the vehicle passing the first device at which a path of the received signal is approximately orthogonal to a direction of travel of the vehicle based on a comparison of a measured received frequency of the received signal to a source frequency of the received signal and to one or more thresholds;
determine a distance from the vehicle to the first device based on at least one of a time of arrival ("TOA") or a round trip time ("RTT") of the received signal at or near the determined time of the vehicle passing the first device at which the path of the received signal is approximately orthogonal to the direction of travel of the vehicle; and
determine a lane in which the vehicle is operating based on the determined distance and a lane map.

16. The system of claim 15, wherein the processor is further configured to cause the processor to determine the lane based on a direction of travel of the vehicle.

17. The system of claim 15, wherein the processor is further configured to cause the processor to determine the lane based on an angle of attack from the antenna to the first device.

18. The system of claim 15, wherein the first device comprises an infrastructure wireless access point.

19. The system of claim 15, wherein the vehicle is a first vehicle and the first device comprises a wireless device disposed within a second vehicle different from the first vehicle.

20. The system of claim 19, wherein the processor is further configured to cause the processor to:
determine a location and a heading of the first vehicle; and
output, to a crowdsourcing server, the location, the heading, and the determined distance to the first device.

21. The system of claim 15, wherein the lane map is received from a crowdsourcing server.

22. A system configured to be mounted in a vehicle comprising:
means for receiving a signal from a first device;
means, disposed within the vehicle and in communication with the means for receiving the signal, for:
determining a time of the vehicle passing the first device at which a path of the received signal is approximately orthogonal to a direction of travel of the vehicle based on a comparison of a measured received frequency of the received signal to a source frequency of the received signal and to one or more thresholds;
determining a distance from the vehicle to the first device based on at least one of a time of arrival ("TOA") or a round trip time ("RTT") of the received signal at or near the determined time of the vehicle passing the first device at which the path of the received signal is approximately orthogonal to the direction of travel of the vehicle; and
determining a lane in which the vehicle is operating based on the determined distance and a lane map.

23. The system of claim 22, wherein the means for determining a lane is further configured to determine the lane based on a direction of travel of the vehicle.

24. The system of claim 22, wherein the means for determining a lane is further configured to determine the lane based on a height of the first device.

25. The system of claim 22, wherein system further comprises:
means for determining a location and a heading of the first device; and
means for outputting, to a crowdsourcing server, the location, the heading, and the determined distance to the first device.

26. The system of claim 22, wherein the lane map is received from a crowdsourcing server.

* * * * *

UNITED STATES PATENT AND TRADEMARK OFFICE
CERTIFICATE OF CORRECTION

PATENT NO. : 10,248,871 B2  
APPLICATION NO. : 15/080383  
DATED : April 2, 2019  
INVENTOR(S) : Bala Ramasamy Page 1 of 1

It is certified that error appears in the above-identified patent and that said Letters Patent is hereby corrected as shown below:

In the Claims

In Column 21, Line 8, in Claim 1, after "signal" insert -- transmitted --.

In Column 21, Line 54, in Claim 8, after "signal" insert -- transmitted --.

In Column 22, Line 47, in Claim 15, after "signal" insert -- transmitted --.

In Column 23, Line 21, in Claim 22, after "signal" insert -- transmitted --.

Signed and Sealed this  
Third Day of September, 2019

Andrei Iancu  
*Director of the United States Patent and Trademark Office*